United States Patent Office 3,037,034
Patented May 29, 1962

3,037,034
PROCESS FOR THE PREPARATION OF ESTERS OF CORTICOSTEROIDS
Robert Joly, Montmorency, and Julien Warnant, Neuilly-sur-Seine, France, assignors, by mesne assignments, to Roussel-UCLAF, S.A., Paris, France, a corporation of France
No Drawing. Filed Apr. 21, 1960, Ser. No. 23,608
Claims priority, application France Apr. 24, 1959
8 Claims. (Cl. 260—397.45)

The present invention relates to a novel process for the preparation of esters of steroid compounds and, more particularly, to a process for the preparation of 21-carboxylic acid esters of 20-keto-steroids of the pregnane and allopregnane series.

The therapeutic importance of esters of different hormones and especially those of the corticosteroids is well-known. However, their direct preparation by a classic method, such as the action of a carboxylic acid halide on the 21-hydroxy-20-keto-steroid of the pregnane or allopregnane series is sometimes difficult and gives only mediocre yields.

It is an object of the present invention to produce 21-carboxylic acid esters of 20-keto-steroids of the pregnane or allopregnane series and especially of the corticosteroids by a novel method giving excellent yield.

It is a further object to develop a process of esterifying 21-hydroxy-20-keto-corticosteroids by interchange of the corresponding 21-p-toluene sulfonate or 21-methane sulfonate ester with an alkali metal salt of the desired carboxylic acid in the presence of a small amount of the corresponding free carboxylic acid and an organic solvent having a high dielectric constant.

It is a further object of the invention to obtain the novel industrial products: the potassium salt of the 21-p-sulfobenzoate of prednisolone, the sodium salt of the 21-m-sulfobenzoate of hexadecadrol, the 21-methane sulfonate ester of hexadecadrol.

These and other objects of the invention will become more apparent as the description proceeds.

The process of the present invention is a means for preparing all the 21-carboxylic acid esters of the 20-keto-steroids of the pregnane and allopregnane series starting with the corresponding alcohols. It is a means particularly for the preparation of the 21-esters of carboxylic acids having 1 to 18 carbon atoms such as formic acid, acetic acid, trimethylacetic acid, phenylacetic acid, propionic acid, β- and γ-cyclopentyl propionic acid, butyric acid, 4,4-dimethyl pentanoic acid, 10-undecenoic acid, hexahydrobenzoic acid, monoesterified hexahydroterephthalic acid, benzoic acid, the alkali metal salts of m- and p-sulfobenzoic acid, etc.

The process of the invention consists essentially of transforming by known processes the 21-hydroxy-20-keto steriods of the pregnane and allopregnane series and especially the corticosteroids into the corresponding 21-sulfonates such as the 21-p-toluene sulfonates or 21-methane sulfonates (tosylates or mesylates) and subjecting the 21-sulfonates to the action of an alkali metal salt of the desired carboxylic acid. This reaction is effected preferably in the presence of a small quantity of esterifying acid, in the free state. An important characteristic of the process is the use of an organic polar solvent having a high dielectric constant such as N,N-dialkylacylamide or dimethylsulfoxide, as the solvent. The reaction is preferably conducted in an inert atomsphere such as a nitrogen atmosphere at temperatures above room temperature to the reflux temperature of the solvent.

The N,N-dialkylacylamide preferred for the reaction is dimethylformamide, but other dialkylacylamides such as for example N,N-dimethylacetamide, N,N-dimethylpropionamide, N,N-dimethylbutyramide, N,N-dimethylvaleramide, N,N-diethylformamide, N,N-diethylacetamide, N-methyl-N-ethylformamide, N-methyl-N-ethylacetamide, N,N-dipropylacetamide, etc. are also suitable.

These N,N-dialkylacylamides have the formula:

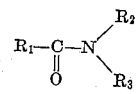

in which $R_1$ represents hydrogen or a lower alkyl radical and $R_2$ and $R_3$ represent lower alkyl radicals. The N,N-dialkylacylamides generally used are liquids, but a solid N,N-dialkylacylamide, dissolved in an inert solvent under the reaction conditions, can be used.

The following non-limitative examples will make the invention better understood. Example 5a describes the details of the preparation of the intermediate mesylates. Table I illustrates the structural formulas of the compounds produced by the examples. It is readily understood that the process is operative with any 21-hydroxy-20-keto-steroid of the pregnane or allopregnane series.

TABLE I

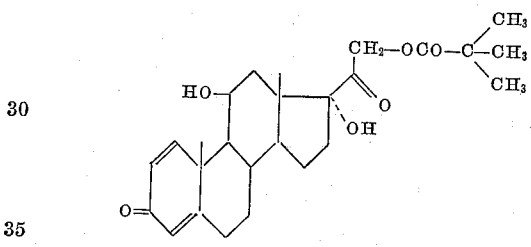

I

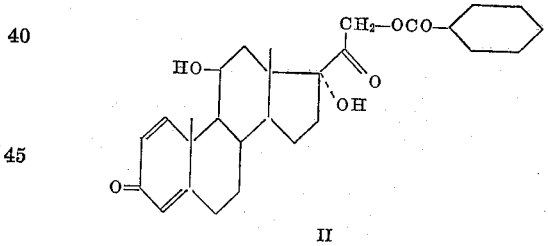

II

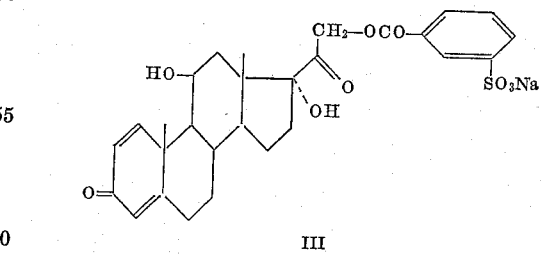

III

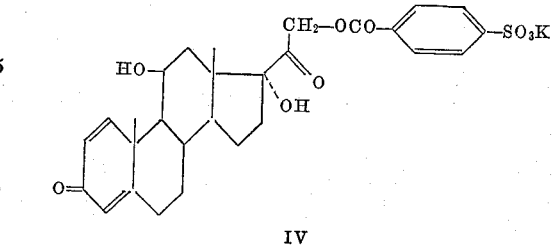

IV

TABLE I—Continued

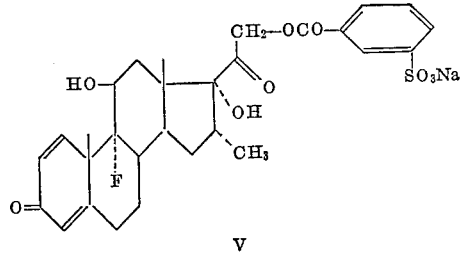

V

The temperatures are indicated in degrees centigrade.

EXAMPLE 1

Preparation of the 21-Pivalate of Prednisolone (I)

0.85 gm. of sodium pivalate is introduced into 20 cc. of dimethylformamide containing 100 mgm. of pivalic acid, then, under agitation and in an atmosphere of nitrogen, 2 gm. of the 21-methane sulfonate ester of prednisolone ($\Delta^{1,4}$-pregnadiene-11$\beta$, 17$\alpha$, 21-triol-3,20-dione) having a melting point of 224° C. (Sarett et al., Chemistry and Industry, 1958, page 1260) are added thereto. The reaction mixture turns yellow, it is heated to 60° C. for an hour, while continuing the agitation under an atmosphere of nitrogen. After cooling to 50° C., the mixture is poured over a mixture of 200 cc. of water and ice. It is agitated for an hour, filtered and the precipitate is washed with water. The washed product is triturated with 20 cc. of water at 95° C., vacuum filtered again at this temperature, washed with warm water and dried to recover 1.8 gm. (that is 89% of theory) of the 21-pivalate of prednisolone (I) having a melting point of 233 to 234° C. The mixture of this compound with the product obtained by the direct action of pivalyl chloride on prednisolone does not show a depression in the melting point.

The product is further purified by recrystallization from hot acetone. The yield on recrystallization is 67% of theory of the 21-pivalate of prednisolone (I) having a melting point of 233 to 234° C. and a specific rotation $[\alpha]_D^{20} = +97.5°$ (c=1% in chloroform). Compound I is obtained in the form of white needles, which remain solvated up to 150° C. under vacuo. Compound I is soluble in chloroform and in hot acetone, slightly soluble in ether and insoluble in water. It is identical to the compound described in Belgian Patent No. 544,994.

EXAMPLE 2

Preparation of the 21-Hexahydrobenzoate of Prednisolone (II)

1 gm. of sodium hexahydrobenzoate is introduced into 20 cc. of dimethylformamide containing 0.5 cc. of hexahydrobenzoic acid. 2 gm. of the 21-methane sulfonate ester of prednisolone, having a melting point of 224° C., are added under an atmosphere of nitrogen, and the mixture is heated for an hour and a half at 60° C. After cooling to 40° C., it is then poured over 200 cc. of a mixture of water and ice. After allowing the mixture to stand for an hour, it is vacuum filtered. The product obtained thereby is washed with water, and taken up in 20 volumes of hot acetone, filtered and iced. The mixture is vacuum filtered and the filter cake is dried to obtain 1.72 gm. (that is 80% of theory) of the 21-hexahydrobenzoate of prednisolone (II), having a melting point of 260° C. and a specific rotation $[\alpha]_D^{20} = +127°$ (c=1%, in methanol).

This product is obtained in the form of white needles, 9.6% solvated, which are soluble in acetone and alcohol, slightly soluble in ether and insoluble in water.

Analysis.—$C_{28}H_{38}O_6$; molecular weight=470.58. Calculated: C, 71.46%; H, 8.14%; O, 20.4%. Found: C, 71.6%; H, 8.2%; O, 20.7%.

EXAMPLE 3

Preparation of the Sodium Salt of 21-m-Sulfobenzoate of Prednisolone (III)

20 cc. of dimethylformamide are added to 2 gm. of sodium m-sulfobenzoate in 5 cc. of water, then, under an atmosphere of nitrogen, 2 gm. of the 21-methane sulfonate ester of prednisolone are added thereto. The reaction mixture is heated to 95° C. under agitation and while bubbling nitrogen through it for eighteen hours. The water is entrained gradually by the nitrogen, and a crystalline suspension of the excess of sodium m-sulfobenzoate is formed which is poorly soluble in dimethylformamide. The suspension is concentrated in vacuo to dryness, then 12 cc. of demineralized water are added thereto. 3.5 gm. of sodium acetate crystals are introduced into the clear yellow solution formed thereby and are dissolved by slight heating. The solution is then allowed to stand at room temperature for 24 hours and the sodium salt of 21-m-sulfobenzoate of prednisolone (III) precipitates out. The precipitate is vacuum filtered, dried to 90° C. and 2.5 gm. of the product are obtained which are purified by recrystallization from 5 cc. of warm water. The yield is 2.15 gm. (that is 82% of theory) of the sodium salt of 21-m-sulfobenzoate of prednisolone having a specific rotation $[\alpha]_D^{20} = +170°$ (c=1% in water) and an ultra-violet spectrum: $\lambda$max. 237 m$\mu$, $\epsilon$=22,850 in water. The product is solvated with one molecule of water and is fairly soluble in alcohol.

Analysis.—$C_{28}H_{31}O_9SNa$; molecular weight=566.6. Calculated: C, 59.34%; H, 5.51%; S, 5.66%. Found: C, 59.4%; H, 5.6%; S, 5.6%.

This compound is identical to that described in the copending U.S. patent application Serial No. 805,674, filed April 13, 1959.

EXAMPLE 4

Preparation of the Potassium Salt of the 21-p-Sulfobenzoate of Prednisolone (IV)

1.15 gm. of potassium carbonate are added to 4 gm. of potassium p-carboxy benzene sulfonate in 5 cc. of demineralized water. When the neutralization is terminated, 40 cc. of dimethylformamide, then 4 gm. of the 21-methane sulfonate ester of prednisolone are added. The introduction of the steroid takes place under agitation and while bubbling nitrogen therethrough. The reaction mixture is heated to 90° C. for fifteen hours, while progressively eliminating the water formed by entrainment with nitrogen. After cooling, the precipitate is vacuum filtered. The filter cake is washed with dimethylformamide and the dimethylformamide solutions are combined and evaporated in vacuo. The residue from the evaporation is taken up with 25 cc. of methanol and then 5 gm. of potassium acetate are added. The potassium salt of the 21-p-sulfobenzoate of prednisolone (IV) crystallizes out. It is vacuum filtered, washed several times with methanol and dried at 80° C. The yield is 3.76 gm. (that is 71% of theory) of a yellowish product having a specific rotation $[\alpha]_D^{20} = +181°$ (c=1% in water). By recrystallization from hot water, a product is obtained in the form of fine white needles solvated with water. This product is slightly soluble in alcohol and acetone and insoluble in ether. The rotatory power remains unchanged by recrystallization. The ultra-violet spectrum is $\lambda$max. 240 m$\mu$, $\epsilon$=34,000 (water).

Analysis.—$C_{28}H_{31}O_9SK$; molecular weight=582.7. Calculated: C, 57.71%; H, 5.36%; S, 5.50%. Found: C, 57.5%; H, 5.6%; S, 5.1 to 5.2%.

The product is not described in the literature.

EXAMPLE 5

Preparation of the Sodium Salt of the 21-m-Sulfobenzoate of Hexadecadrol (V)

(a) Preparation of the 21-methane sulfonate ester.—10 gm. of hexadecadrol (9$\alpha$-fluoro-16$\alpha$-methyl-$\Delta^1$-hydrocortisone) having a melting point of 280 to 283° C. and a specific rotation $[\alpha]_D^{20} = +74°$ (c=1% in dioxane) are dissolved in 20 cc. of anhydrous pyridine, 20 cc. acetone are added thereto, the solution is cooled to −10° C. and 3 cc. of methanesulfonyl chloride are added over a period of three hours. The reaction mixture is then allowed to stand for an hour and a half at a temperature between −7° and −10° C. 200 cc. of water are then introduced into the mixture, which is agitated for an hour and vacuum filtered. The precipitate is triturated several times with water, then dried to 80° C. in order to recover 12 gm. (that is a quantitative yield) of the raw 21-methane sulfonate ester of hexadecadrol having a melting point of 248° C. This raw ester is purified by dissolution in 5 volumes of boiling acetone, filtration and precipitation with water. After vacuum filtering and drying, 10.1 gm. of the product, having a melting point of 250° C., a specific rotation $[\alpha]_D^{20} = +81° \pm 1.5°$ (c=1% in dioxane) and a solvation=0.5 mol of water, are obtained. Evaporation of the mother liquor permits the recovery of a second crop of 0.65 gm., having a melting point of 250° C.

The product is obtained in the form of white needles slightly soluble in alcohol and ether, fairly soluble in acetone and almost insoluble in water.

*Analysis.*—$C_{23}H_{31}FO_7S$; molecular weight=470.5. Calculated: C, 58.71%; H, 6.64%; S, 6.81%; F, 4.04%. Found: C, 59.0%; H, 6.7%; S, 6.7 to 6.9%; F, 3.7%.

This compound is not described in the literature.

(b) *Preparation of m-sulfobenzoate.*—The disodium salt of m-sulfobenzoic acid is prepared first.

For this purpose, 5 gm. of the sulfochloride of benzoic acid are introduced into 15 cc. of water and heated to 100° C. for four hours. Next, the mixture is evaporated to dryness in vacuo and the crystallized product is heated for two hours at 95° C. in vacuo in order to completely eliminate the hydrochloric acid. The acid obtained thereby is dissolved in 5 cc. of water, and 3.7 gm. of sodium bicarbonate and then 50 cc. dimethylformamide are added very slowly.

To the solution of the disodium salt of m-sulfobenzoic acid thus formed, 5 gm. of the 21-methane sulfonate ester of hexadecadrol, having a melting point of 250° C., are added under an atmosphere of nitrogen and the reaction mixture is heated for twenty hours at 90° to 95° C. During the last hours of heating, the excess disodium salt of m-sulfobenzoic acid crystallizes. The mixture is concentrated to dryness in vacuo, the crystalline residue is taken up in 50 cc. of water and 8 gm. of sodium acetate are added thereto. The entire mixture is cooled and allowed to stand at room temperature for sixteen hours. The sodium salt of the 21-m-sulfobenzoate of hexadecadrol (V) precipitates, is vacuum filtered and triturated twice with 10 cc. of water. The product is recrystallized by dissolution in 50 cc. of hot methanol. The solution is filtered in the presence of charcoal, then the filtrate is concentrated to 20 cc. and cooled. After vacuum filtering, the filter cake is triturated with water and dried at 90° C. to recover 5.25 gm. (that is 80% of theory) of the product (V) in the form of very fine white needles which are fairly soluble in alcohol, slightly soluble in acetone and insoluble in ether and benzene. In water, this compound is soluble to the extent of 1.5% at 20° C., and 17% at 95 to 100° C. Compound V has a specific rotation $[\alpha]_D^{20} = +134°$, (c=1% in water) and an ultraviolet spectrum: λ max.=236 mμ, ε=24,400 (water), and on the anhydrous product ε=25,800.

*Analysis.*—$C_{29}H_{32}O_9FSNa$; molecular weight=598.6. Calculated: C, 58.18%; H, 5.39%; F, 3.17%; S, 5.36%; Na 3.84%. Found: C, 58.3%; H, 5.5%; F, 3.1%; S, 5.1%; Na, 3.4%.

The aqueous mother liquor yielded an additional 0.6 gm. (that is 9%) of the product.

This compound is not described in the literature.

The 21-m-sulfobenzoates of prednisolone and hexadecadrol are equally as efficacious as an anti-inflammatory as the parent steroids, prednisolone and hexadecadrol. Moreover, they are better tolerated than the known corticosteroids, and they are better in such a use in situ as, for instance, in ophthalmology, in the form of collyria.

It is well understood that the invention is not limited to the specific examples described above. It is possible to vary the temperature, the order of introduction of the reagents or to use other solvents with a high dielectric constant without departing from the spirit of the invention or the scope of the appended claims.

We claim:

1. A process for the preparation of the 21-organic carboxylic acid esters, said organic carboxylic acid moiety having from 1 to 18 carbon atoms, of 21-hydroxy-20-keto-steroids selected from the group consisting of the prednisolone and hexadecadrol which comprises the steps of subjecting the 21-organic sulfonic acid esters of said 21-hydroxy-20-keto-steroids to the action of an alkali metal salt of an organic carboxylic acid having from 1 to 18 carbon atoms in the presence of an organic polar solvent selected from the group consisting of N,N-dialkyl acyl amide and dialkyl sulfoxide at elevated temperatures, and recovering said 21-organic carboxylic acid esters of 21-hydroxy-20-keto-steroids.

2. The process of claim 1 wherein said 21-organic sulfonic acid ester is the 21-p-toluene sulfonate.

3. The process of claim 1 wherein said 21-organic sulfonic acid ester is the 21-methane sulfonate.

4. The process of claim 1 wherein the reaction between said 21-organic sulfonic acid ester and said alkali metal salt of an organic carboxylic acid is carried out in the presence of a small amount of said organic carboxylic acid in the free state.

5. The process of claim 1 wherein said organic polar solvent is an N,N-dialkylacylamide having the formula

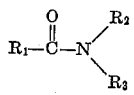

where $R_1$ is a member selected from the group consisting of hydrogen and lower alkyl radicals and $R_2$ and $R_3$ represent lower alkyl radicals.

6. The process of claim 1 wherein said organic polar solvent is dimethylsulfoxide.

7. The process of claim 1 wherein the reaction between said 21-organic sulfonic acid ester and said alkali metal salt of an organic carboxylic acid is carried out in a nitrogen atmosphere at temperatures above room temperature to the reflux temperature of said solvent.

8. A process for the preparation of 21-organic carboxylic acid esters, said organic carboxylic acid moiety having from 1 to 18 carbon atoms, of 21-hydroxy-20-keto-steroids selected from the group consisting of prednisolone and hexadecadrol which comprises the steps of subjecting a 21-sulfonate ester of said 21-hydroxy-20-keto-steroids, said sulfonate ester selected from the group consisting of methane sulfonate and p-toluene sulfonate esters, to the action of an alkali metal salt of an organic carboxylic acid having from 1 to 18 carbon atoms, in the presence of a small amount of said organic carboxylic acid in the free state and an organic polar solvent selected from the group consisting of dimethylsulfoxide and N,N-dialkylacylamides having the formula

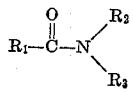

where $R_1$ represents a member selected from the group consisting of hydrogen and lower alkyl radicals and $R_2$ and $R_3$ represent lower alkyl radicals, in an inert atmosphere at temperatures up to the reflux temperature of said solvent and recovering said 21-organic carboxylic acid esters of 21-hydroxy-20-keto-steroids.

References Cited in the file of this patent

UNITED STATES PATENTS

| | | |
|---|---|---|
| 2,865,935 | Schneider | Dec. 23, 1958 |
| 2,894,963 | Gould et al. | July 14, 1959 |
| 2,908,696 | Nussbaum et al. | Oct. 13, 1959 |

OTHER REFERENCES

Boland: "California Medicine," vol. 88, No. 6, June 1958.

Oliveto et al.: "Journal of American Chemical Society," vol. 80 (1958), p. 4431.